June 16, 1925.

M. H. MASSUERE

TIRE CHAIN TOOL

Filed May 4, 1923

1,542,629

Inventor
Mark H. Massuere
by Wilkinson & Ginsta
Attorneys.

Patented June 16, 1925.

1,542,629

UNITED STATES PATENT OFFICE.

MARK HEBER MASSUERE, OF CHEYENNE, WYOMING.

TIRE-CHAIN TOOL.

Application filed May 4, 1923. Serial No. 636,603.

*To all whom it may concern:*

Be it known that I, MARK H. MASSUERE, a citizen of the United States, residing at Cheyenne, in the county of Laramie and State of Wyoming, have invented certain new and useful Improvements in Tire-Chain Tools; and I do hereby declare the following to be a full, clear, and exact description of the invention, such as will enable others skilled in the art to which it appertains to make and use the same.

The present invention relates to improvements in tire chain tools and relates more particularly to a tool adapted for drawing the ends of Weed or other tire chains together upon the tire of a vehicle whereby the chain may be with greater facility engaged and locked in place.

An object of the invention is to provide a tool which will firmly engage the locking hook avoiding any likelihood of disengagement or slipping and to provide a tool which is thin and easily manipulated while also sliding easily into the hook and permitting of the easy withdrawing of the tool from the hook.

A further object of the invention resides in providing a curved tool to induce an automatic sliding of the chain link toward the hook in the act of applying the stress whereby to increase the leverage and reduce the necessary applied power to a minimum.

With the foregoing and other objects in view, the invention will be more fully described hereinafter, and will be more particularly pointed out in the claims appended hereto.

In the drawings, wherein like symbols refer to like or corresponding parts throughout the several views—

Figure 1:
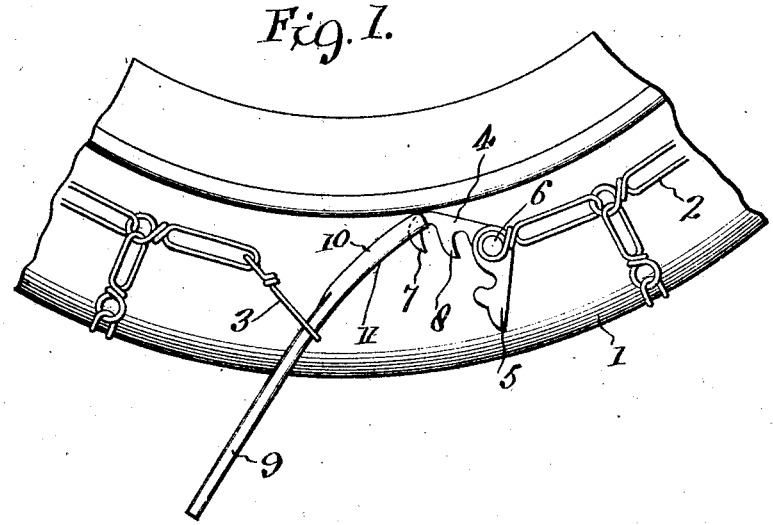
Figure 1 is a fragmentary side view of a tire and chain with the improved device shown in an initial position.

Referring more particularly to the drawings 1 designates a pneumatic or other vehicle tire and 2 indicates generally a tire chain of the Weed or other variety. These chains are kept in the tool box or other storage place in the vehicle and are applied to the tires in wet weather or upon slippery or muddy roads in order to avoid skidding. The chains are provided with hooks or clasps at one end to receive the links 3 upon the other ends of the chain after the latter has been wrapped about the tire. The clasp comprises a pair of cooperating members 4 and 5 pivoted together at 6 upon a chain link and generally having an outer hook 7 and an inner hook 8, which hooks are closed by the clasp member 5 when such members are swung together. This is a well known construction.

The improved tool is used to draw the clasp and the chain link 3 together and this tool is preferably made from a single piece of flat sheet metal susceptible of being bent and the major portion of the tool is bent into a tubular form to provide a handle 9 which is substantially straight, the roundness being agreeable to the hand of the user and this tubular part of the tool being preferably of small diameter to economize in material, to render the device light and the expense of making it small, but it will be appreciated that, due to the bending of the sheet metal into this tubular form and to the major straight portion of the handle, the lightness of the tool and the saving in the material is not attended by any weakness as considerable strain is involved in drawing these chains together. The operative end of the tool is struck on the arc of a circle which merges with the handle portion, the curvature taking place from a center that is inwardly with respect to the edges of the sheet metal.

This operative end of the tool is substantially flat along its inner circumference and flanges 10 extend outwardly from opposite longitudinal edges thereof, lying approximately at right angles to the flat inner curved circumferential portion 11 in order to reinforce and strengthen the operative end to resist any tendency in the curved portion to buckle or become distorted. The free edges of the sheet metal at the operative end are not brought together but the full benefit from the flanges is secured by leaving the operative end open at the rear and extending the flanges back at right angles for the entire depth of the sheet metal. This construction further reinforces the entire tool throughout. The operative end is further made with a longitudinal slot 12 in the inner flat part 11 and near the extremity of said end, leaving only a small tip or connecting part 13 beyond the slot for the purpose of engaging either of the hooks 7 or 8, the slot 12 being sufficiently long to clear the hook 8 when the device is engaged within the hook 8 of the clasp.

Figure 2:
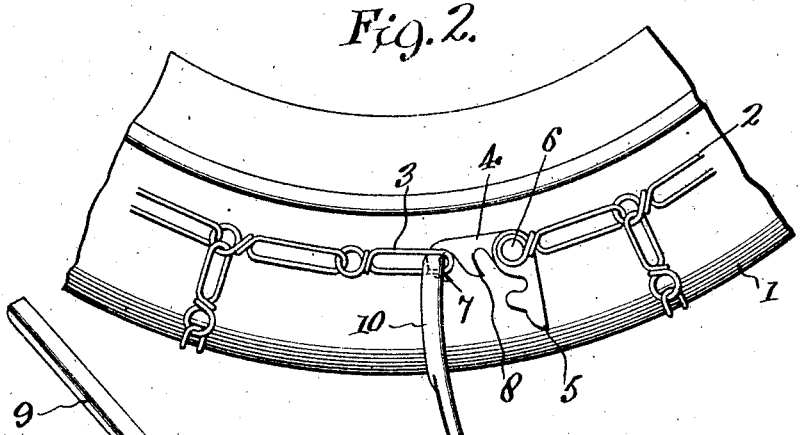
Figure 2 is a similar view showing the same parts in a final position.
Figure 3:
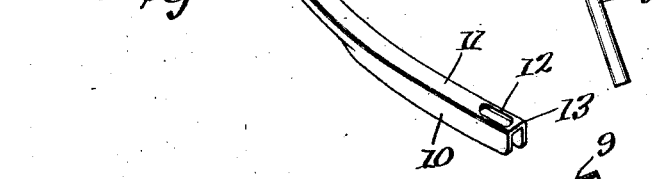
Figure 3 is a perspective view of the improved tool.
Figure 4:
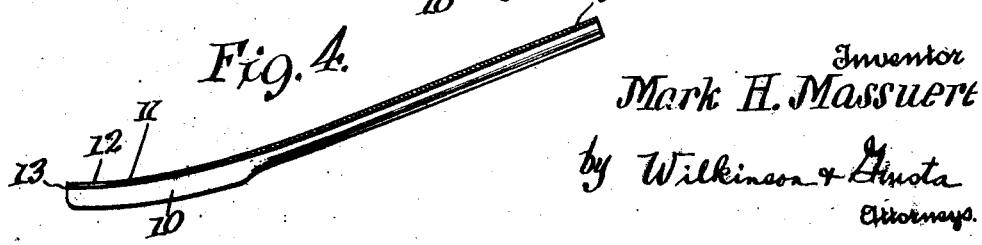
Figure 4 is a longitudinal section taken centrally through the same.

The manner of use of the device is clear from Figures 1 and 2. The handle 9 is inserted through the link 3 and the slot 12 engaged over either of the hooks. In the instance shown the slot is slipped over the hook 7 and the connecting bar 13 lies within the space between the hooks 7 and 8. In this position, the tool is swung as a lever from the initial position shown in Figure 1 to the position illustrated in Figure 2. It will be seen that the link 3 and the clasp are drawn together, the link 3 riding into the hook 7. The tool can be further forced over toward the right to disengage the same from the hook and afterwards the clasp member 5 is closed thus securing the link 3 against accidental escape.

In like manner the tool may be engaged with the hook 8 in which case any looseness or slack in the chain will be taken up, the link 3 resting finally in the hook 8.

By inserting the slotted end of the tool into the chain link on the hook and holding the slotted end of the tool at right angles to the hook, the chain link can be easily slid out of the hook upon the tool, thus making the detaching of the chain an easy matter.

The slotted end of the tool holds the tool firmly on the hook, preventing slipping in any direction. The thinness of the tool end that works in the hook gives ample room for the chain link to slide easily into the hook and allows easily withdrawing of the tool from the hook.

The curved portion of the tool permits the chain link to automatically slide towards the hook as the stress is applied, thus increasing the leverage as the stress increases and reducing the necessary applied power to a minimum.

It is obvious that various changes and modifications may be made in the details of construction and design of the above specifically described embodiment of this invention without departing from the spirit thereof, such changes and modifications being restricted only by the scope of the following claims:

What is claimed is:—

1. An improved tire chain tool composed of light thin sheet metal comprising a handle portion substantially straight and tubular, and an operative end curved from the handle portion with the center of the curvature inwardly of the intermediate part of the sheet metal from which the tool is made, said operative end being substantially flat on its inner circumference and having flanges extending outwardly from opposite edges of the flat portion, said flanges being substantially at right angles to the flat portion and the operative end of the tool being open between the flanges at its outer side, said flanges merging into the outer portion of the tubular handle, said flat inner portion of the operative end of the tool having an elongated slot near its extremity and provided with a connecting bar at the outer end of the slot, said connecting bar being thin and adapted to engage over a hook of the clasp member carried by the chain.

2. A tire chain tool comprising a handle made substantially straight and of sheet metal bent into approximately tubular form with the meeting edges of the sheet metal extending axially thereof, said sheet metal also providing an operative end of the tool, said operative end being curved from the handle on a sweeping arc and having the inner circumference portion provided by the intermediate part of the sheet metal with the edges of the sheet metal extending outwardly of the curved part, the inner curved part being substantially flat and the sheet metal being bent at substantially right angles from opposite edges of said flat part to form reinforcing flanges, said flat portion near the end of the tool being provided with an elongated slot adapted to engage over either hook of a tire chain clasp, and a thin connecting bar at the outer end of the slot adapted to take into either hook selectively.

3. A non-skid tire chain applying tool formed of a bar having a shank adapted to be grasped by the hand and having a hook engaging element at its inner end for engagement with the hook of a non-skid chain, and the bar having its inner end portion disposed at a substantial angle to the shank and connected to the shank by a curved portion bowed toward the portion of the chain it engages and the concave surface of which is adapted to engage and guide a link of a chain into engagement with the hook as the bar is moved in the chain tightening direction.

MARK HEBER MASSUERE.